United States Patent [19]

Balukin et al.

[11] Patent Number: 4,944,564
[45] Date of Patent: Jul. 31, 1990

[54] BRAKE VALVE DEVICE ARRANGED FOR ELECTRO-PNEUMATIC CONTROL

[75] Inventors: Richard F. Balukin, Pittsburgh; John R. Reiss, North Versailles; Frank J. Jerina, Irwin, all of Pa.

[73] Assignee: American Standard Inc., Wilmerding, Pa.

[21] Appl. No.: 357,567

[22] Filed: May 26, 1989

[51] Int. Cl.$^5$ .............................................. B60T 15/54
[52] U.S. Cl. ...................................... 303/33; 303/67; 303/77
[58] Field of Search ................... 303/20, 33, 35, 36, 303/59, 60, 66, 67, 75, 77

[56] References Cited

U.S. PATENT DOCUMENTS 4,830,437  5/1989  Rumsey ........................... 303/67 X

OTHER PUBLICATIONS

Wabco Publication 4208-30, Westinghouse Air Brake Division, American Standard Inc., Feb. 1981.
Wabco Publication 4208-26, Westinghouse Air/Brake Division, American Standard, Inc. Feb. 1981.

Primary Examiner—Duane A. Reger
Attorney, Agent, or Firm—G. J. Falce

[57] ABSTRACT

An operators's brake valve device for a railway locomotive that is adapted to provide brake pipe recharging in a holding position of the brake valve handle in which the release of brake cylinder pressure is cut off by a release magnet valve device that, in conjunction with an appliction magnet valve device, provides electro-pneumatic control of the train brakes. These magnet valves are controlled electrically via pneumatically piloted electrical switches that receive discrete pressure signals according to the different positions of the brake valve handle.

9 Claims, 2 Drawing Sheets

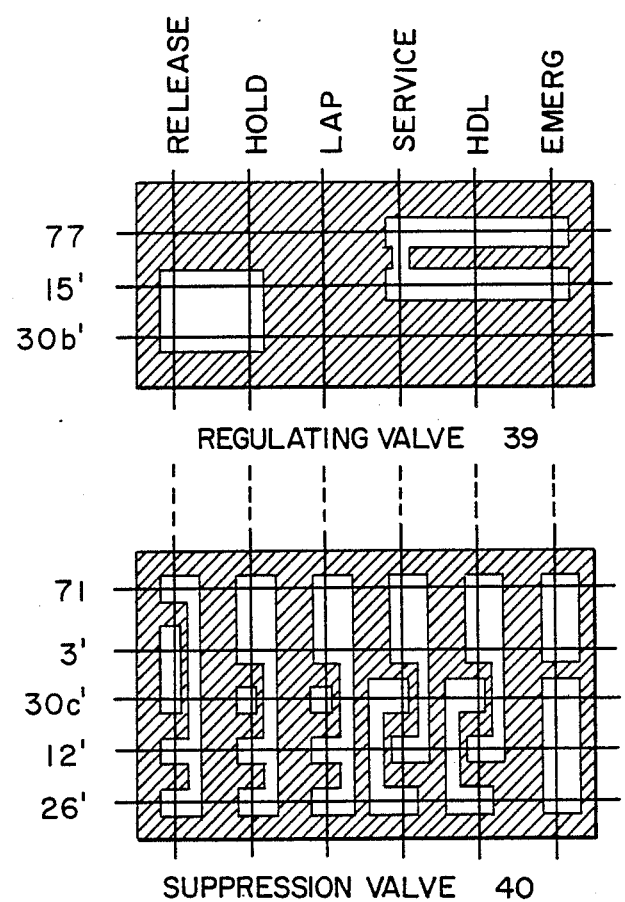

BRAKE VALVE DEVICE ARRANGED FOR ELECTRO-PNEUMATIC CONTROL

BACKGROUND OF THE INVENTION

The present invention relates to locomotive brake valve devices and in particular to such brake valve devices as are employed in transit-type electro-pneumatic brake systems.

One type of current electro-pneumatic brake equipment consists basically of a standard 26-E1 automatic brake valve, as shown and described in WABCO Publication 4208-26. Movement of the brake valve handle through its operating range controls contact closures for brake Release, Holding, Lap, Service, and Emergency functions to obtain transmission of electrical signals through trainline wires to an Application and Holding magnet valve located on each cab car and on all trailer cars when such are employed in a train. These valves in turn initiate a brake application, a brake release, or a brake holding function locally on each car of the train, thereby producing a faster brake response than would otherwise be obtained with a straight pneumatic control of the brakes. Moreover, the brake holding function has the additional advantage of permitting recharge of the brake pipe pressure following a brake application, without causing a concurrent release of the brakes except when the brake valve is moved to its release position.

Concurrently with the electrical control, the 26-E1 brake valve also initiates automatic pneumatic brake control in the various handle positions of the brake valve via the trainline brake pipe to operate the car control valves in parallel with the aforementioned electrical control. Such an arrangement provides for an automatic pneumatic back-up control in the event the electrical control fails for any reason.

It is well known that the 26-E1 brake valve, like all 26 type brake valves, is designed for pedestal mounting, as opposed to desk-style mounting arrangements generally employed today in keeping with the trend toward modernized cab design. In order to satisfy requirements for such desk-style mounting without departing from the time-proven dependability of the 26-type brake valve, a brake valve having a modular-type design that is well suited for desk-style mounting is presently being supplied to the railroads. This 30-type brake valve, as shown and described in WABCO O.& M. Publication 4208-30, is basically similar to the 26-type brake valve, except for its modular design. Where electro-pneumatic brake control is required, additional design modifications have been incorporated to adapt it to electrical control, in the manner of the 26-E1 brake valve.

SUMMARY OF THE INVENTION

The object of the present invention, therefore, is to provide a 30-type brake valve device adapted for electro-pneumatic brake operation in a manner similar to the 26-E1 type brake valve, in the sense that a Holding position is provided, but without employing cam-operated electrical switches via which the electro-pneumatic brake control is achieved.

In accordance with the present invention, this is achieved by the use of electrical switches operated by pilot pressure from the brake valve device, as opposed to mechanically actuated electrical switches presently operated by brake valve handle actuated cams. These piloted electrical switches receive pressure signals from the brake valve in accordance with the positioning of a suppression valve spool member in the various handle positions. In providing for a Holding position between Release and Lap positions of the brake valve handle, one of the above-mentioned pressure signals undergoes a discrete signal change in the transition between the Holding position and the Release position as a means of recognizing or distinguishing therebetween. Such distinction is necessary since the condition of the brake valve regulating valve in Holding position is necessarily the same as in Release position in order to recharge the brake pipe pressure. This permits the release magnet valve to cut off the exhaust of brake cylinder pressure via the control valve device, which assumes its release condition in response to the brake pipe pressure increase in accordance with the brake valve regulating valve recharging the brake pipe in Holding position.

BRIEF EXPLANATION OF THE DRAWINGS

This object and other objects and attendant advantages of the invention will become more readily apparent from the following detailed explanation when taken in conjunction with the accompanying drawings in which:

FIG. 2 is a position diagram showing various port connections typically made by the brake valve regulating valve in the different handle positions of the brake valve device; and FIG. 3 is a position diagram showing the various port connections made by the brake valve suppression valve in the different handle positions of the brake valve device, as required in accordance with the present invention.

DESCRIPTION AND OPERATION

Figure 1:
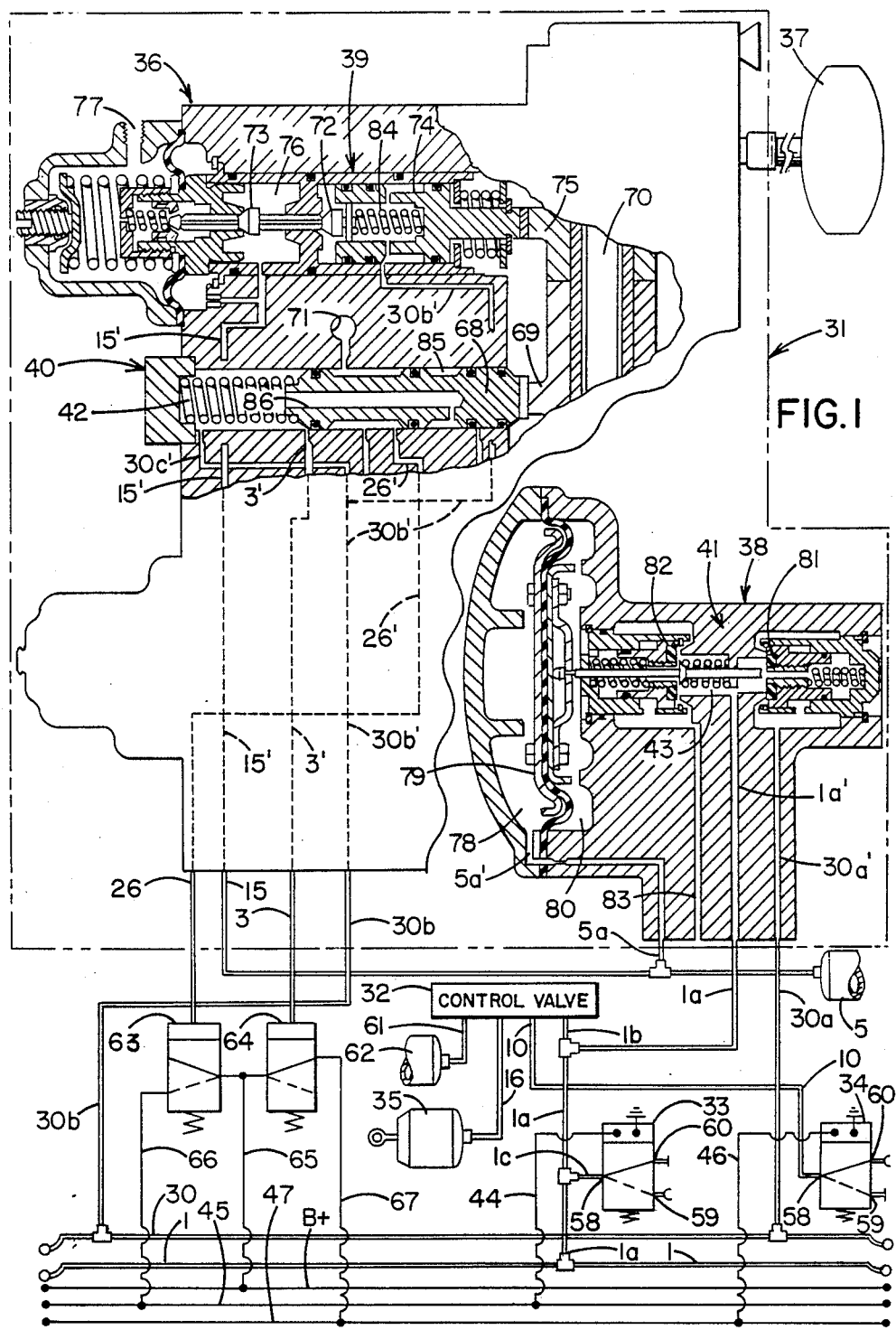
FIG. 1 is a diagrammatic view of an electro-pneumatic brake system including pneumatic switches associated with a brake valve device that is adapted to operate the pneumatic switches in a manner to permit recharging the train brake pipe pressure following a brake application without effecting a brake release.

Referring now to FIG. 1, there is shown an electro-pneumatic brake system for a passenger-type rail vehicle including a modular brake valve device 31, a control valve device 32, application and holding magnet valve devices 33 and 34, and a brake cylinder device 35. Brake valve device 31 comprises a pressure regulating module 36 that is mounted desk-style for operation by movement of a handle 37, and a relay valve module 38 that is remotely mounted relative to module 36, and to which the train brake pipe 1 is connected via a branch pipe 1a. Module 36 may be a modified standard, well-known 30A-CDW brake valve portion, as shown in WABCO O.& M. publication 4208-30, including a, combination self-lapping, and, non self-lapping regulating valve 39 and a standard type suppression valve 40. Module 38 may be a standard well-known C-2-W relay valve portion, also shown in WABCO O.M. publication 4208-30, including a relay valve 41.

Brake valve handle 37 is provided with several distinct handle positions, including Release, Holding, Lap, Service, Handle Off, and Emergency, each position being defined by a detent. In that regulating valve 39 is non self-lapping from lap through emergency positions, the provision of distinct Lap and Service positions is required, between which the brake valve handle must be manipulated in order to control the degree of service application desired, as compared to brake valves having self-lapping regulating valves that automatically vary the degree of service application according to the position of the brake valve handle in a service zone of application between Release and Service positions.

A source of compressed air is supplied to a main reservoir pipe 30 that is continuous through the train. branch pipe 30a connects this compressed air from pipe 30 to the relay valve 41 via passage 30a'.

Another branch pipe 30b connects the compressed air supplied to pipe 30 to regulating valve 39 of module 36 via passage 30b' and to a spring chamber 42 of suppression valve 40 via a branch passage 30c'.

Brake pipe 1 is connected by a branch pipe 1a and a passage 1a, to a delivery chamber 43 of relay valve 41; by a branch pipe 1b to control valve device 32; and by a branch pipe 1c to application magnet valve device 33.

A wire 44 connects the solenoid operator of magnet valve device 33 to an application train line wire 45 and a wire 46 connects the solenoid operator of magnet valve device 34 to a holding trainline wire 47. Each magnet valve device is provided at its pneumatic portion with an inlet 58 and outlets 59 and 60. Inlet 58 of application magnet valve device 33 is connected to brake pipe branch pipe 1c, outlet 59 is vented to atmosphere, and outlet 60 is blanked. Inlet 48 of holding magnet valve device 3 is connected to an exhaust pipe 10 of control valve device 32, outlet 59 is blanked, and outlet 60 is vented to atmosphere.

Connected to control valve device 32, in addition to brake pipe branch pipe 1b and exhaust pipe 10 is a brake cylinder pipe 16 of brake cylinder device 35, and a supply pipe 61 of a supply reservoir 62.

Arranged in conjunction with regulating valve module 36 of brake valve device 31 are pressure switches 63 and 64. These pressure switches each include a pneumatic actuator portion to which pipes 26 and 3 are connected, and a spring biased, single pole, single throw switch portion. The movable switch member of pressure switches 63 and 64 are connected by a wire 65 to a trainline wire B+ that is connected to a source of electrical power. A normally open contact of pressure switch 63 is connected by a wire 66 to application wire 45, while the normally closed contact of pressure switch 64 is connected by a wire 67 to holding wire 47.

Pipes 26 and 3 are connected to brake valve module 36 from where these pipes are in turn connected to suppression valve 40 via corresponding passages 26' and 3'. Suppression valve 40 comprises a spool member 68 that is operable through a cam member 69 mounted on a shaft 70 of handle 37, in the different handle positions, to establish the pressurization and depressurization of the respective passages 26' and 3', as indicated in the position diagram of FIG. 3. In their depressurized condition, these passages 26' and 3' are connected to an exhaust port 71 of suppression valve 40, while in the pressurized condition, these passages 26' and 3' are connected to passage 30c'.

Heretofore described regulating valve 39 includes a supply valve 72 and an exhaust valve 73, as well as a spool valve 74. Regulating valve 39 is operable through a cam member 75 mounted on shaft 70 independently of cam member 69. Supply valve 72, in conjunction with spool valve 74, controls the supply of compressed air from passage 30b' to a delivery chamber 76, and exhaust valve 73 controls the exhaust of compressed air from delivery chamber 76 to atmosphere via a vent port 77.

A passage 15' and associated pipe 15 connects this delivery passage to an equalizing reservoir 5 and via a branch pipe 5a and passage 5a' to a control chamber 78 of relay valve 41. A control piston 79 separates control chamber 78 from a feedback or compensating chamber 80 with which brake pipe pressure effective in delivery chamber 43 is communicated. A supply valve 81 controls the supply of compressed air from passage 30a' to delivery chamber 43, while an exhaust valve 82 connects delivery chamber 43 to an exhaust passage 83.

RELEASE AND CHARGING

In Release position of handle 37, cam member 75 positions spool valve 74 to admit compressed air from passage 30b' to regulating valve supply valve 72, which is open, exhaust valve 73 being closed. Compressed air is thus supplied to equalizing reservoir 5 from main reservoir pipe 30 via branch pipe 30b passage 30b', spool valve 74, the open supply valve 72 of regulating valve 39, chamber 6, passage 15' and pipe 15, as indicated in the position diagram of FIG. 2 relative to Release position. The compressed air supplied to equalizing reservoir 5 is terminated automatically by closure of supply valve 72 when the pressure setting of regulating valve 39 is reached.

Equalizing reservoir pressure is effective in control chamber 78 of relay valve 41 to effect closure of exhaust valve 82 and opening of supply valve 81. Compressed air is thus connected from main reservoir pipe 30 to brake pipe 1 via branch pipe 30a, passage 30a', open supply valve 81, passage 1a' and branch pipe 1a. This charging communication continues until the feedback of brake pipe pressure to compensating chamber 80 causes relay valve 41 to close supply valve 81, at which point the brake pipe pressure is charged in accordance with the pressure setting of regulating valve 39.

At control valve device 32, this increase in brake pipe pressure is effective to charge supply reservoir 39 and to connect air from brake cylinder device 35 to exhaust pipe 10 via control valve device 32 in a well-known manner.

Also in Release position of handle 37, Suppression valve 40 establishes the passage connections, as indicated in the position diagram of FIG. 3. Cam member 69 positions spool valve 68 to connect compressed air from main reservoir pipe 30 to pipe 3 via branch pipe 30b, passage 30b', spring chamber 42, and passage 3'. At the same time, pipe 26 is vented via passages 26', spool valve 68 and exhaust port 71.

Pressurization of pipe 3 in conjunction with depressurization of pipe 26 causes pressure switches 63 and 64 to disconnect wire B+ the respective application and holding wires 45,47. The application and release magnet valves 33,34 are deenergized, such that inlet 58 is connected to outlet 60 at both valves. This results in brake pipe branch 1c being blanked by application magnet valve 33 and exhaust pipe 10 being vented to atmosphere by holding magnet valve 34.

Accordingly, the brake system is charged and the brakes released in a well-known manner.

Service

When it is desired to make a service brake application, brake valve handle 37 is moved from Release position to Service position. Spool valve 74 is moved in the right-hand direction to cut off the supply of compressed air from passage 30b' to supply valve 72 which is opened together with exhaust valve 73, thereby releasing air from equalizing reservoir 5 and thus from control chamber 78 of relay valve 41 via pipe 15, passage 15', exhaust valve 73 and exhaust port 77.

The resultant reduction of pressure in relay valve chamber 78 creates a pressure differential across piston 79. Relay valve 41 is thus actuated to effect opening of its exhaust valve 82, thereby releasing air from brake pipe 1 via branch pipe 1a, passage 1a', the open exhaust valve 82 and exhaust passage 83.

Control valve device 32 is operative in response to this reduction of brake pipe pressure to interrupt the exhaust connection of brake cylinder pipe 16 with exhaust pipe 10 and to connect air from supply reservoir 62 to brake cylinder 35 via brake cylinder pipe 16.

At the same time, suppression valve 40 of brake valve device 31 is moved in a left-hand direction by cam 69 to make the passage connections, as indicated, in the position diagram of FIG. 3. Passage 26' is aligned with spool valve groove 85 and passage 3' is aligned with spool groove 86. Compressed air supplied via passage 30b' and 30c' pressurizes passage 26' via spring chamber 42, while passage 3' is depressurized via exhaust port 71. Pressurization of passage 26' and thus pipe 26 causes pressure switch 63 to connect power from wire B+ to application wire 45 via wires 65 and 66 thereby energizing application magnet valve 33. Depressurization of passage 3' and thus pipe 3 causes pressure switch 64 to connect power from wire B+ to holding wire 47 via wires 65 and 67, thereby energizing holding magnet valve 34. In the energized condition of application magnet valve 33, inlet 58 is connected to outlet 59, thereby exhausting brake pipe pressure via branch pipes 1a and 1c in parallel with the exhaust of brake pipe pressure via relay valve exhaust passage 83. In the energized condition of holding magnet valve 34, inlet 58 is connected to outlet 59, thereby cutting off the venting of exhaust pipe 10.

The degree of brake application provided by control valve device 10 is determined by the degree of brake pipe pressure reduction, which is in turn determined by the duration brake valve handle 37 is left in service position.

Lap

When a reduction of brake pipe pressure is achieved corresponding to the degree of brake application desired, the brake valve handle is moved to Lap position. Regulating valve spool 74 is moved in the left-hand direction by cam 75, but not sufficiently to open the porting from passage 30b' to supply valve 72.

The supply of compressed air in passage 30b' thus continues to be cut off as exhaust valve 73 is closed by its spring 84, thereby terminating the reduction of equalizing reservoir pressure via exhaust valve 73 and exhaust port 77. Since brake pipe pressure follows the equalizing reservoir pressure, the reduction of brake pipe pressure at relay valve 41 is also terminated by the self-lapping action of the relay valve.

Concurrently, movement of handle 37 to Lap position causes cam 69 to move suppression valve 40 in a rightward direction to a position in which passages 3' and 26' are connected to exhaust port 71 via spool valve groove 86 to vent these passages, as indicated in the position diagram of FIG. 3. Pipes 3 and 26 are accordingly vented via these vented passages 3' and 26' Accordingly, pressure switch 63 disconnects power to application wire 45, while pressure switch 64 connects power from wire B+ to holding wire 47. Application magnet valve 33 is thus deenergized, while holding magnet valve 34 is energized. Branch pipe 1c of brake pipe branch 1a is thus disconnected from vented outlet 59 and blanked at outlet 60 of application magnet 33, thereby terminating the brake pipe reduction, while exhaust pipe 10 continues to be cut off from atmosphere at outlet 59 of holding magnet valve 34.

Holding

In accordance with the provisions of the present invention, a Holding position of brake valve handle 37 is located between Release and Lap positions, as indicated in the position diagrams of FIGS. 2 and 3. In providing a Holding position, it is desired to recharge brake pipe 1, as normally occurs in Release position, but without the attendant release of the brakes. In order to achieve this, regulating valve 36 must assume a condition corresponding to Release position, while suppression valve 40 assumes a condition corresponding to Lap position, when brake valve handle is in Holding position.

It will be appreciated, therefore, that suppression valve 44 in Holding position is conditioned to provide the same pneumatic connections made in Lap position. Therefore, passages 3' and 26' are vented, as are the corresponding pipes 3 and 26, via spool valve groove 86 and the suppression valve exhaust port 71. Accordingly, pressure switch 63 disconnects wire B+ from application wire 52, and pressure switch 64 connects wire B+ to wire 54. Magnet valve 33 is thus deenergized and magnet valve 34 is energized, the former cutting off brake pipe venting there at and the latter cutting off the exhaust of brake cylinder pressure, as explained relative to Lap position.

At the same time, regulating valve 36, in Holding position, establishes the same operating condition as provided in Release position, in that passage 15' is recharged with main reservoir pressure in pipe 30 via branch pipe 30b, passage 30b', spool valve 74, and supply valve 72. In recharging passage 15', equalizing reservoir pressure is accordingly increased, being effective at relay valve 41 of brake valve module 38 to effect a corresponding increase in brake pipe pressure.

Control valve device 32 is operative in response to this increase in brake pipe pressure, in a well-known manner, to connect brake cylinder pipe 16 to exhaust pipe 10. However, due to holding magnet valve 34 being energized in Holding position, as heretofore explained, exhaust pipe 10 is cut off from atmosphere to interrupt the venting of brake cylinder pressure.

Accordingly, brake pipe pressure is recharged to the pressure setting of regulating valve 36 without a consequent release of the train brakes occurring. Electrified control of the train brakes with pneumatic back-up is thus enhanced by this feature of the invention, in which the train operator is provided with a brake valve handle position that provides optional recharging of the brake pipe pressure, while maintaining a brake application in effect.

Moreover, this invention can be adapted to standard 26 and 30 type brake valve devices, as an alternative to brake valve cam operated electric switches, to control magnet valves connected to trainline application and holding wires, without requiring any substantial modification of the brake valve proper, by simply replacing the existing brake valve cam with an appropriate cam 69 that establishes the desired positioning of suppression valve 40 relative to passage 3', in Holding position of brake valve handle 37, as indicated in FIG. 3.

We claim:

1. A brake valve device for charging a brake pipe to a certain chosen pressure and for venting said brake pipe, such charging and venting of said brake pipe effecting operation of a control valve device to admit fluid under pressure to a brake cylinder device and to release fluid under pressure from said brake cylinder device, such release of fluid under pressure from said brake cylinder device being controlled via electro-pneumatic means in series with said control valve device, said brake valve device comprising:

(a) means for selecting different operating conditions of said brake valve device including a Release condition and a Holding condition;

(b) a first passageway having discrete pressure states;

(c) suppression valve means operative for effecting one discrete pressure state of said first passageway in said Release condition of said brake valve device and for effecting another discrete pressure state in said Holding condition of said brake valve device; and (d) first pressure switch means operative in response to said other pressure state of said first passageway for effecting operation of said electro-pneumatic means such as to cut off said release of fluid under pressure from said brake cylinder device.

2. A brake valve device as recited in claim 1, wherein said brake valve device having said different operating conditions further includes a Service condition.

3. A brake valve device as recited in claim 2, further comprising:

(a) a second passageway having discrete pressure states;

(b) said suppression valve means for further effecting one discrete pressure state of said second passageway corresponding to said one discrete pressure state of said first passageway in said Service position;

(c) second pressure switch means operative in response to said one pressure state of said second passageway for effecting said operation of said electro-pneumatic means such as to provide said venting of said brake pipe.

4. A brake valve device as recited in claim 3, wherein said selecting means is a movable handle having different positions corresponding to s id different operating conditions of said brake valve device, said handle in a Holding position being between a Release position and a Service position.

5. A brake valve device as recited in claim 4, wherein said brake valve device is further provided with a Lap condition, said handle in said Lap condition having a Lap position between said Holding position and said Service position.

6. A brake valve device as recited in claim 5, wherein said brake valve device is non self-lapping.

7. A brake valve device as recited in claim 5, wherein said first passageway in said Service and Lap conditions of said brake valve is in said other pressure state.

8. A brake valve device as recited in claim 7, further comprising:

(a) regulating valve means for setting said certain chosen pressure to which said brake pipe is charged in said Release position of said handle; and (b) cam means operative in response to said movement of said handle to said Holding position for effecting operation of said regulating valve means in accordance with operation thereof in said Release position, and for effecting operation of said suppression valve means in accordance with operation thereof in said Lap position.

9. A brake valve device as recited in claim 3, wherein said second passageway in said Release, Holding and Lap positions of said brake valve handle is in said other pressure state.

* * * * *